(12) United States Patent
Deixler et al.

(10) Patent No.: US 10,667,346 B2
(45) Date of Patent: May 26, 2020

(54) LIGHTING CONTROL CONFIGURATION

(71) Applicant: SIGNIFY HOLDING B.V., Eindhoven (NL)

(72) Inventors: Peter Deixler, Arlington, MA (US); Remco Magielse, Tilburg (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/339,114

(22) PCT Filed: Sep. 21, 2017

(86) PCT No.: PCT/EP2017/073945
§ 371 (c)(1),
(2) Date: Apr. 3, 2019

(87) PCT Pub. No.: WO2018/065229
PCT Pub. Date: Apr. 12, 2018

(65) Prior Publication Data
US 2020/0045796 A1    Feb. 6, 2020

(30) Foreign Application Priority Data
Oct. 3, 2016 (EP) .................................. 16192041

(51) Int. Cl.
*H05B 37/02* (2006.01)
*G06K 9/00* (2006.01)

(52) U.S. Cl.
CPC ..... *H05B 37/0227* (2013.01); *G06K 9/00691* (2013.01); *H05B 37/0218* (2013.01); *H05B 37/0245* (2013.01)

(58) Field of Classification Search
CPC ................ H05B 37/02; H05B 37/0245; H05B 37/0272; H05B 37/0227; H05B 37/0218; H04W 4/029; H04W 4/38; H04W 4/50; H04L 67/12; H04L 67/18; G06K 9/00624; G06K 9/00691
See application file for complete search history.

(56) References Cited

U.S. PATENT DOCUMENTS

| 9,113,514 | B2* | 8/2015 | Wang ................. H05B 37/0245 |
| 9,363,861 | B2* | 6/2016 | Chalmers ................ F21V 29/77 |
| 9,610,063 | B2* | 4/2017 | Foroughi ............. A61B 8/4245 |
| 9,955,551 | B2* | 4/2018 | Spero ....................... B60Q 1/04 |
| 2013/0145610 | A1 | 6/2013 | Feri et al. |

(Continued)

FOREIGN PATENT DOCUMENTS

| WO | 2011151772 A1 | 12/2011 |
| WO | 2016018067 A1 | 2/2016 |

*Primary Examiner* — Haissa Philogene
(74) *Attorney, Agent, or Firm* — Meenakshy Chakravorty

(57) ABSTRACT

A method for configuring a lighting system including one or more sensors for controlling one or more lighting units for providing illumination of an area. The method allows a target area to be determined for a particular sensing function, and then determines suitable sensor locations based on a mapping derived from an image of the area in question. The target area can be determined based on recognition of relevant objects such as doors and window for example. The sensor location or locations may be selected from existing sensor locations which may be integrated with a luminaire, or new sensor locations may be proposed.

14 Claims, 6 Drawing Sheets

(56) References Cited

U.S. PATENT DOCUMENTS

| | | |
|---|---|---|
| 2013/0226353 A1 | 8/2013 | Park |
| 2013/0332114 A1 | 12/2013 | Dasu et al. |
| 2014/0240469 A1 | 8/2014 | Lee |
| 2014/0297227 A1 | 10/2014 | Barnard |
| 2015/0076992 A1 | 3/2015 | Walma |
| 2016/0198286 A1 | 7/2016 | Nakai et al. |
| 2019/0259108 A1* | 8/2019 | Bongartz .............. A01B 79/005 |
| 2019/0394857 A1* | 12/2019 | Chraibi .............. H05B 37/0236 |

* cited by examiner

LIGHTING CONTROL CONFIGURATION

CROSS-REFERENCE TO PRIOR APPLICATIONS

This application is the U.S. National Phase application under 35 U.S.C. § 371 of International Application No. PCT/EP2017/073945, filed Sep. 21, 2017, which claims the benefit of European Patent Application No. 16192041.8, filed on Oct. 3, 2016. These applications are hereby incorporated by reference herein.

TECHNICAL FIELD

The present disclosure relates to configuration of a lighting system and associated method.

BACKGROUND

"Connected lighting" refers to a system of luminaires which are controlled not by (or not only by) a traditional wired, electrical on-off or dimmer circuit, but rather via a wired or more often wireless network using a digital communication protocol. Typically, each of a plurality of luminaires, or even individual lamps within a luminaire, may each be equipped with a wireless receiver or transceiver for receiving lighting control commands from a lighting control device according to a wireless networking protocol such as ZigBee, Wi-Fi or Bluetooth (and optionally also for sending status reports to the lighting control device using the wireless networking protocol). Such systems can be automated, or semi-automated, and frequently include sensors, either integrated into a luminaire or standalone devices, to provide input to the system for controlling the output illumination.

Examples of sensors used in lighting systems include light sensors and motion detectors. Such sensors allow a system to adjust lighting in response to changing ambient light conditions, and also in response to occupancy or spaces such as rooms or offices. Such sensors need to be configured to provide appropriate coverage and operation for automated control. Next to motion and occupancy sensors, lighting systems may also include other environmental sensors such as humidity sensors, air quality sensors ($CO_2$,CO), noise sensors (to map noise pollution across the building or a city).

SUMMARY

Configuration of sensors in a lighting system can however be cumbersome, both for consumer and professional applications. Configuration may involve walk-tests to assess whether a motion sensor is triggering correctly from a targeted area, and where motion should be detected; typically the user has to adjust the sensor position and sensor sensitivity by trial and error until a satisfactory result is achieved.

It would be desirable to provide improved sensor configuration for a lighting system.

Accordingly, in one aspect of the invention there is provided a method for configuring a lighting system including one or more sensors for controlling one or more lighting units for providing illumination of an area, said method comprising obtaining one or more images of the area; for a given sensing function, identifying at least one target area where said sensing function is to occur; mapping, based on said obtained image, said target area to one or more sensor locations suitable for providing sensing at said target area; and outputting said one or more sensor locations.

In this way lighting control assets (e.g. occupancy sensors, light sensors) and their suitability to fulfil certain lighting controls functions can be automatically mapped based on a captured image of the environment in which the system operates. This makes configuration less complex and time consuming for a user or installer.

In one embodiment, the or each target area is identified automatically based on analysis of the one or more obtained images. Thus the image can be analyzed to extract information relating to use of the space, and conditions within the space, which in turn allows appropriate target areas to be determined. Analysis may comprise object recognition in embodiments, for example recognizing one or more predetermined objects. Such objects may be predetermined objects or classes of objects, such as doors or windows, and templates or other information may be stored about such objects to allow them to be recognized or matched in an obtained image. Other objects include office furniture such as desks, partitions, chairs and filing cabinets for example. In addition to objects, a lack of objects, or clear areas may be identified, which can be indicative of thoroughfares or pathways for example. Determination of target areas may then be based on said identified objects or pathways.

The sensor locations may be selected from one or more predetermined locations in examples. Typically these predetermined locations correspond to existing sensors in the relevant space or area. The locations of these existing sensors may be known in advance, or determined during the configuration, based on an obtained image. The sensors may be identified in a similar way to objects such as doors and windows described above for example.

In one embodiment, existing sensors may be mounted in or on, or integrated into lighting units or luminaires. Luminaires may include sensor sockets, which can be field-upgraded with sensors. Therefore the sensor positions are selected from the positions of the luminaires, which again can be known in advance or determined during configuration. In some examples, a group of luminaires will each have an integrated sensor or sensors, however only one, or a subset of such sensors is desired to perform a particular sensing role (e.g. occupancy sensing, daylight sensing) for the group. In embodiments then, a group of luminaires can be identified and designated, and a subset or one of the luminaires can be identified for a given sensing role for the group, based on an image or images of the space covered by that group of luminaires. Such a sensor, if present can be activated or configured accordingly, or a recommendation can be provided to attach or install such a sensor.

In examples, the target area or areas need not be automatically identified based on an image, but can be identified manually, i.e. by user input. In an example a user can input a target area into an image (i.e. a 2D image space) or in a 3D model. Input can be via a GUI for example, and it may be possible to provide such input during capturing of the relevant image or images.

In embodiments, the method further comprises capturing said received one or more images with an image capture device (e.g. a mobile phone which is to be understood as including a smart phone, tablet or other mobile computing device other than a sensor for controlling the one or more lighting units), by a user. The user can be prompted to take such an image or images, and in embodiments, a prompt or prompts may be provided to the user to assist in timing and/or direction or position of image capture.

In embodiments, the one or more images includes a panoramic image composed of a plurality of sub-images. Although a single image, such as a wide angle image, may be used, a panoramic image typically allows a greater field of view and captures more information.

In addition to the image or images, the corresponding viewpoint, from which they were captured, may also be obtained. In embodiments, the target area or areas is determined based on such a view point, and in some embodiments, images from multiple different viewpoints are obtained. Preferably the image or images are taken from the primary location(s) where the end user will be triggering the sensors (e.g. a chair or transition areas in residential or work-space in an office) or for daylight sensing from the target area for the illumination (e.g. on the table of an office worker).

The output of the one or more sensor locations may be provide to a user in embodiments, for example by indicating on a graphical display, either in 2D or 3D, and the indication may be superposed on the obtained image or images. In the case that a sensor is not already positioned at the output location, the user may be prompted to provide a sensor, either by moving an existing sensor, or by providing a new sensor. In other embodiments however, the output can be provided directly to a lighting system. In this way the output can be used to configure the system, or at least certain aspects of the system automatically. For example one or more existing sensors can be activated or deactivated, or calibrated for example. Also the control logic controlling inputs and outputs to the lighting system can be updated accordingly. For daylight sensor placement and/or calibration, the user may be asked to take an image at various times of the day (e.g. at midnight when dark and at 12:00 noon); in this way it is possible to distinguish between the contributions of the artificial lighting and natural lighting.

Aspects of the invention also provide a lighting system for implementing lighting control configuration methods as described above. The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention extends to methods, apparatus and/or use substantially as herein described with reference to the accompanying drawings.

Any feature in one aspect of the invention may be applied to other aspects of the invention, in any appropriate combination. In particular, features of method aspects may be applied to apparatus aspects, and vice versa.

Furthermore, features implemented in hardware may generally be implemented in software, and vice versa. Any reference to software and hardware features herein should be construed accordingly.

BRIEF DESCRIPTION OF THE DRAWINGS

Preferred features of the present invention will now be described, purely by way of example, with reference to the accompanying drawings, in which.

DETAILED DESCRIPTION OF EMBODIMENTS

Figure 1:
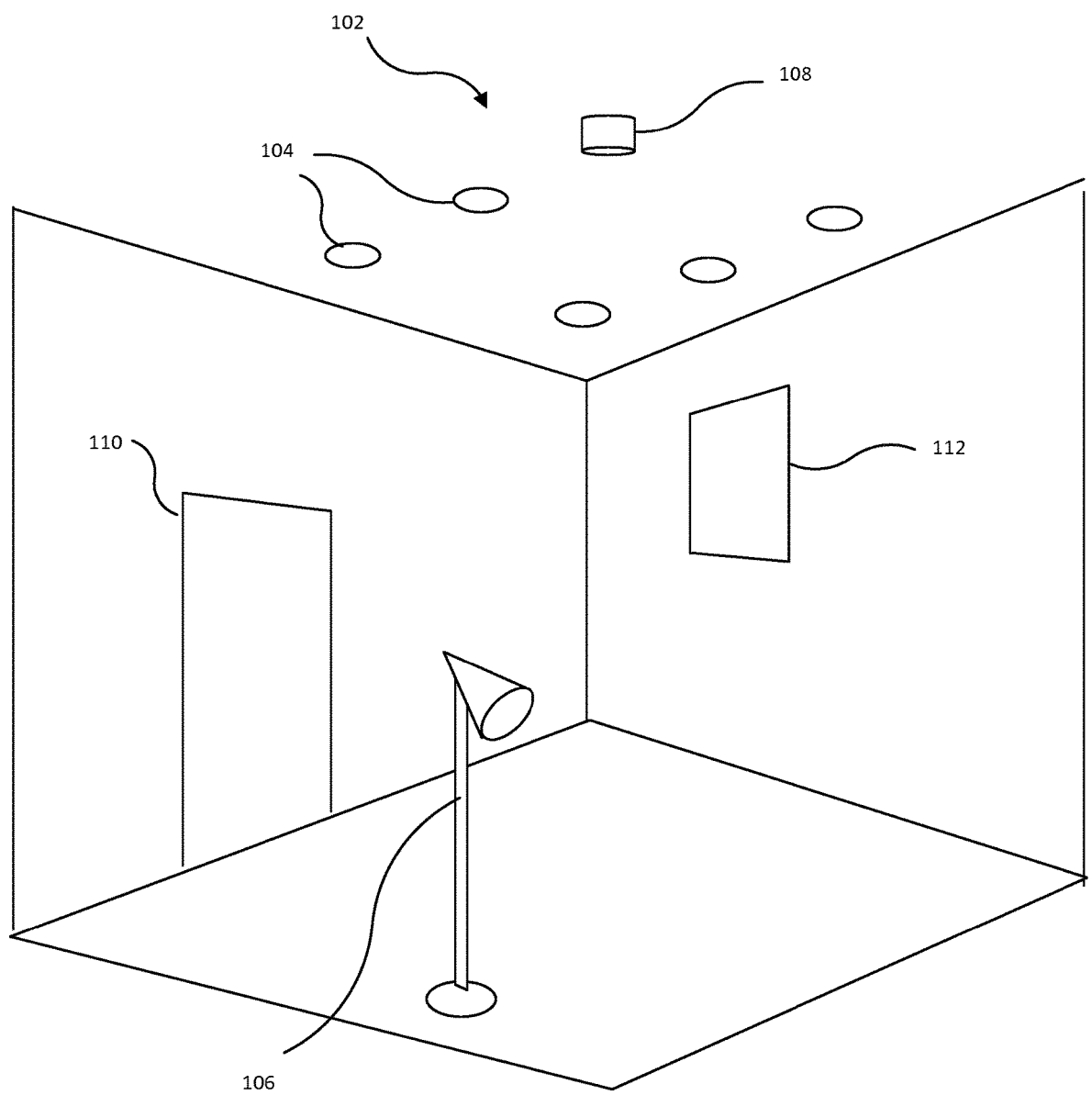
FIG. 1 shows an example of a room including a plurality of lighting units and sensors.

FIG. 1 shows a lighting system installed or otherwise disposed in an environment 102, e.g. an indoor space such as a room, however the environment need not be indoors, and could be outdoors, such as a street for example. The lighting system includes one or typically a plurality of luminaires, each comprising one or more lamps (illumination emitting elements) and any associated housing, socket(s) and/or support. LEDs may be used as illumination emitting elements, but other alternatives such as incandescent lamps e.g. halogen lamps are possible. A luminaire is a lighting device or unit for emitting illumination on a scale suitable for illuminating an environment 102 occupiable by a user. In this example, luminaries include a plurality of ceiling mounted downlighters exemplified by 104 and a floor standing lamp 106. A wide variety of different types of luminaire are of course possible, including uplighters, spotlights, strip lighting etc. A system may include multiple instances of a luminaire type, and multiple different luminaire types. Luminaires can be portable (i.e. their location can be changed easily, and can even continue to run for a limited period of time without connection to mains due to internal energy storage units). Luminaires such as downlighters 104 or lamp 106 may include an integrated sensor, such as a movement sensor or light sensor. Additionally or alternatively one or more dedicated sensors such as movement sensor 108 may be included in the system. Also shown in the room of FIG. 1 are a door 110 and a window 112.

Figure 2:
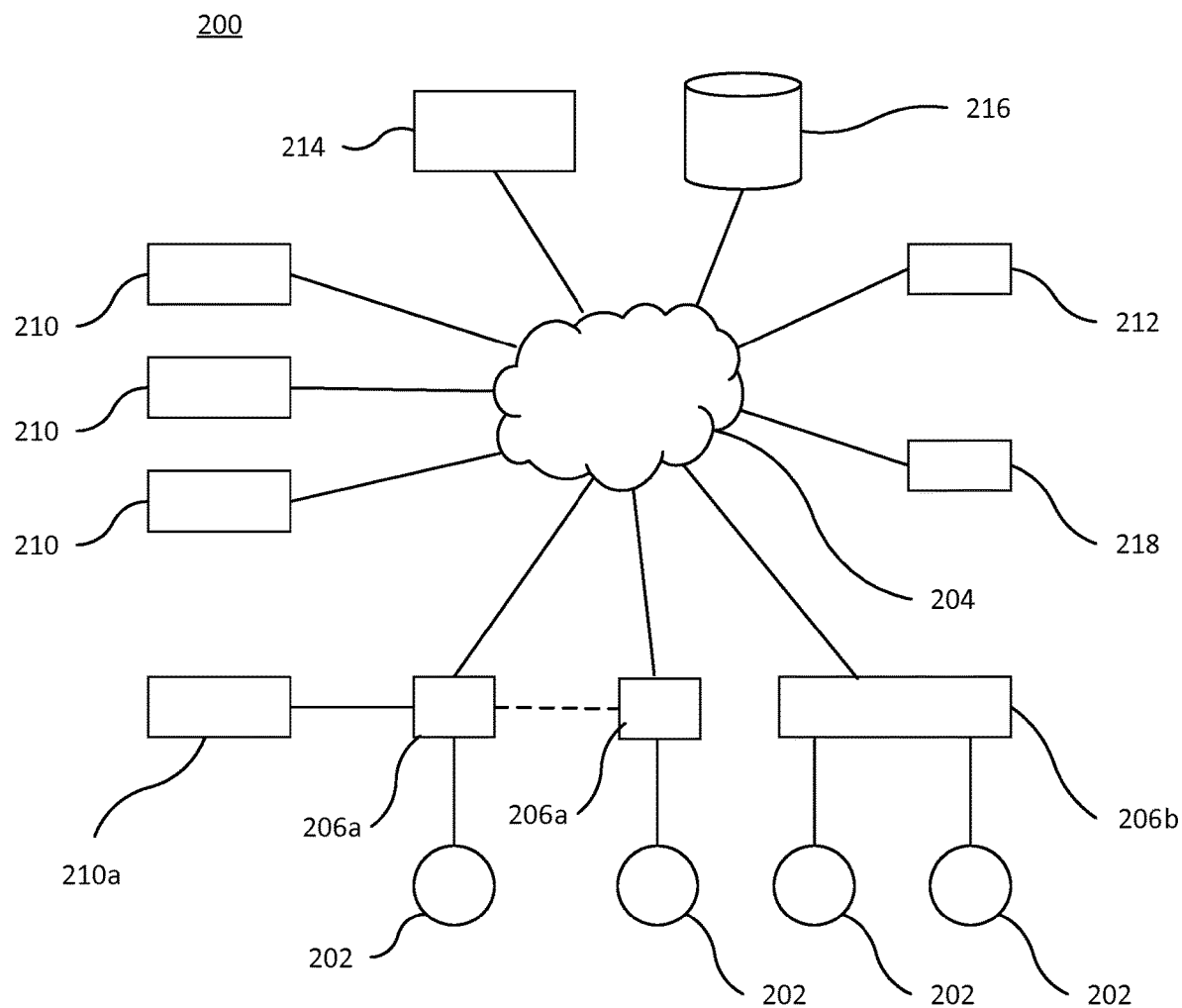
FIG. 2 illustrates a lighting system schematically.

Referring to FIG. 2, a lighting management or control system 100 is illustrated schematically. The lighting system, or at least the lighting units or luminaires 202 thereof, may be installed in an indoor space or environment such as a room or office or shop, or potentially in an outdoor environment such as a town or city or park, for example.

A plurality of lighting units or luminaires 202 are provided, which may take a wide variety of forms such as those discussed in relation to FIG. 1. The lighting units typically include one or more light emitting elements, such as LED elements or lamp elements. The lighting units are connected to a network 204 via lighting drivers or controllers 206. Each lighting unit may have a dedicated controller as in the case of controllers 206*a*, or alternatively a common controller may be provided for a group of lamps as in 206*b*. In the case of a common controller, an additional, dedicated controller or driver (not shown) may be provided for each lighting unit. A dedicated controller for a lighting unit may be integrated into the lighting unit.

Lighting drivers or controllers are able to send and receive communications signals to the network, and can use such communication signals to appropriately drive the lighting unit(s) to provide desired output illumination. Additionally or alternatively, lighting controllers may be able to communicate directly to other lighting controllers, as shown by a dashed line in FIG. 2.

A plurality of sensors 210 are provided, coupled to the lighting system 200 via network 204. The sensors are typically arranged in or around the environment to be illuminated by the lighting system, and can sense a wide variety of environmental or ambient conditions from electromagnetic signals to acoustic signals, to biological or chemical signals for example, for providing information about the environment and events in the environment. Examples of sensors include an IR detector, a camera, a microphone, a motion detector, a chemical sensor, a light sensor, a UV sensor, and a position sensor, although many other types of sensor are equally possible. A sensor or sensors may also be integrated with a lighting device, as shown by sensor 210a, which is connected to the driver 106a of a lighting unit.

The system may further include one or more user control units 212 to allow a user or users to interface with the lighting system. The user control unit may be a dedicated unit such as a control panel, or remote control, but may also be any device which is capable of acting as an interface which can communicate with the system, such as a mobile telephone, computer, tablet or smartwatch for example, running an application or "app". Preferably the user control unit 212 provides a graphical user interface (GUI) for example on a touchscreen. In FIG. 2, the user control unit is shown as a standalone device, however it is possible for one or more such units to be integrated into other components of the system, such as central management system (CMS) 114 for example.

The central management system (CMS) provides control logic to control the lighting system, and in particular the output of lighting units 202, in response to a plurality of inputs, for example from sensors 210 and user control units 212, and from stored programs, settings, schedules and/or routines which may be stored in a memory 216, which may in examples be integrated with CMS 214. The CMS (and optionally memory 216) may be a single, central controller, or may be distributed, with separate units controlling groups of lighting units for example. It is even possible that the CMS is completely distributed to the lighting units themselves, in examples where some or all of the lighting units include some processing capability. Such a distributed system may further comprise a single controller for coordinating overall control for example.

The system may further include a network interface 218, for connecting the system with other networks or devices. This allows the system to exchange information with other lighting systems, which may be similar systems for example, or with networks such as the internet, or other networks related to the space or environment in which the system is located.

Network 204 which allows the various components of the system 200 to communicate with each other may be a single network, or may in fact be comprised of multiple, possibly overlapping networks. The network or networks may use any wired or wireless communication protocol, or a combination of such protocols. Examples of possible protocols include Ethernet, TCP/IP, cellular or mobile communications protocols such as GSM, CDMA, GPRS, 3G, LTE etc., Wifi (such as IEEE 802.11), Bluetooth or Zigbee. Where messages or data are exchanged between two system components using a combination of protocols, a converter may be provided to convert the data or message from one protocol or format to another.

Figure 3:
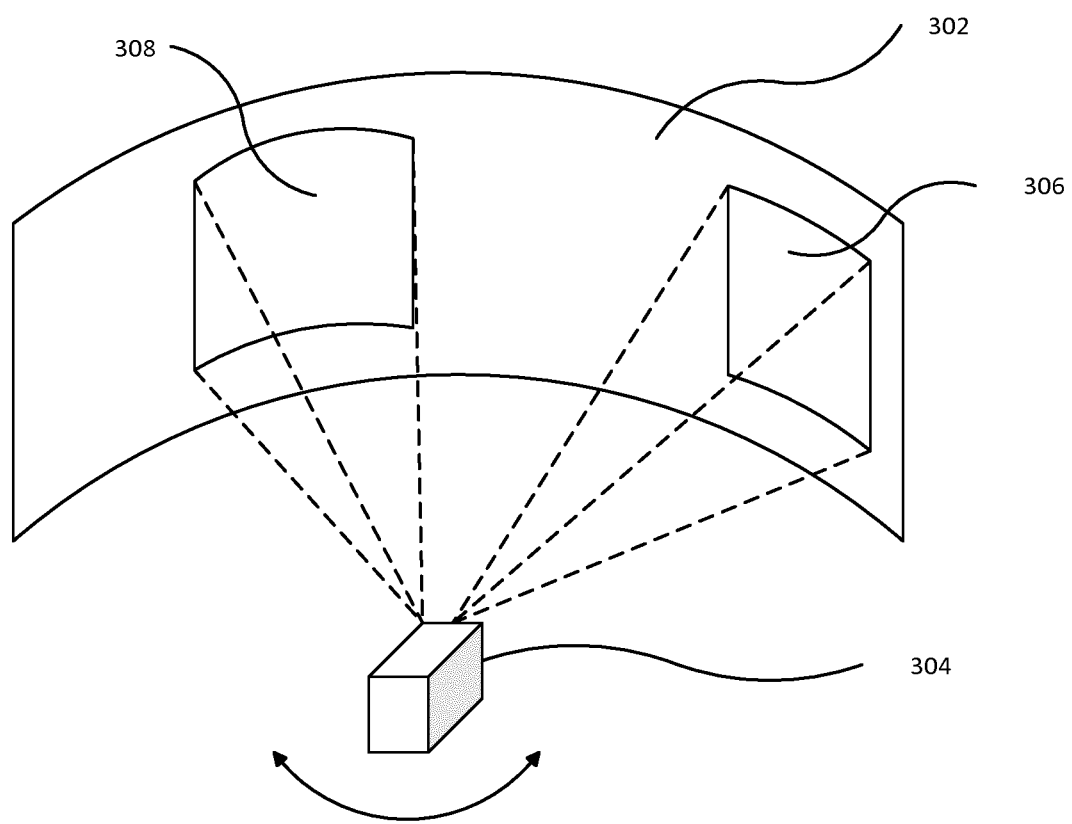
FIG. 3 illustrates a panoramic image capture process.

FIG. 3 illustrates a panoramic image and constituent image portions.

The term panoramic image generally refers to an image that is generated by stitching multiple images together by applying a suitable image processing algorithm that is executed on a processor comprising one or more CPUS and/or GPUS, wherein each image is taken, i.e. captured, at non-overlapping moments in time. Such image stitching algorithms are known in the art, and are readily available. Each of these images is herein referred to as a sub-image of the panoramic image. FIG. 3 illustrates the generic concept of capturing a panoramic image 302 via a scanning motion of a camera device from right to left. The term "scanning motion" refers to the motion of the camera device, as multiple sub-images are captured as part of the panoramic image.

As can be seen in FIG. 3, an image capture device such as a camera 304, captures a plurality of individual sub-images 306, 308 at a plurality of different instances in time, and these are combined, i.e. stitched together, to form the panoramic image. The field of view of the camera device determines the extent of the physical space that is captured in each sub-image, i.e. each sub-image captures a region of the physical space that is smaller than the region of the physical space that is captured by the panoramic image. The field of view of the camera device refers to the solid angle through which the camera's image sensor is sensitive to electromagnetic radiation (e.g. photons of visible light). The field of view covered by an individual image refers to the field of view of the camera when the image is captured, which depends on the position and orientation of the camera.

In some embodiments, the camera device may capture multiple sub-images of the same region of physical space. That is, the region of physical space that falls within the field of view of the camera device may be captured multiple times before a subsequent sub-image, covering a different region of the physical space, is captured.

It will be appreciated that, whilst FIG. 3 is shown from the perspective of a user performing a scanning motion from side to side, in reality, a user may perform a scanning motion in any direction, in any of three spatial dimensions. Therefore component of scanning in an upwards and downwards direction can be included, so the panoramic image is not necessarily bounded by the height dimension of an individual sub image. Furthermore, a user may rotate their camera device through any angle, about any axis, or combination of axes, in three spatial dimensions. In most circumstances it is anticipated that the user will wish to capture a panoramic image of the physical space that is in their own field of view, which in turn, is most likely to involve rotating their body, and consequently their camera device. Thus the panoramic image has a wider field of view than any one of the images individually, in the sense that it corresponds to light captured over a greater solid angle and hence, from a larger spatial area than any one image alone. In other words, the stitching together effectively widens the field of view of the camera, beyond its physical limitations.

Imaging a scene or environment, such as by taking a panoramic image, allows objects in the image to be identified and can allow the position of objects in the image to be determined. More generally, imaging an environment or space allows a modelling or mapping of the space to be performed, and can allow spatial relationships between objects, planes and surfaces in that space to be determined. Example techniques for identifying and locating objects include multiple cameras (stereoscopic vision) IR depth imaging, laser measurement such as lidar, or ultra-wide band techniques for example. For specific objects such as luminaires or sensors (or luminaires having embedded sensors) those objects can be adapted to be identifiable, for example by emitting coded light, or RF signals.

Therefore, as the user captures an image from his or her viewpoint, information about the luminaires and/or sensors in the image can either be captured automatically (e.g. reading QR codes on the sensor or a sensor having beacons supporting precision localization and reading out model number) or can later be added by the user by indicating the position of sensors on the image. One embodiment for precision localization makes use of known Ultra-wideband (UWB) technology, which is capable of precision locating and tracking. If UWB is used in the commissioning device and the sensors, it is possible to point and identify a sensor and its MAC ID.

From capturing an image or images, such as a panoramic image, the following information may be obtained:

The position of occupancy sensors

The spatial coverage of occupancy sensors (which part of the room can be covered by each occupancy sensor)

The quality of sensor coverage at areas relevant from the perspective of the end-user (e.g. sitting living room couch or entering the room via the door)

The position & size of windows (incl. North-South orientation) to optimize daylight sensing The position of luminaires (to enable daylight sensing at those lights)

Based on this information the system may generate a 2D or 3D map or model of the sensors, windows, sensor coverage areas and the sensitivity of sensor to recognize motion at the primary locations of the user.

The capture of an image can further allow a primary viewing position and/or direction of viewing to be determined. The primary viewing position can be taken as the position from which the image or images are captured for example. The primary viewing direction may be indicated by a specific user input, for example during a panning action for taking a panoramic image. Alternatively the primary viewing direction can be estimated based on the content of the captured image, for example identification of a television may indicate a primary viewing direction in a cinema room. Another example using the primary viewing direction is for an office worker typing on his computer. It is desired that the motion sensor is mounted in such a way that it can detect the minor motion of the fingers (i.e. fingers are not blocked by the body).

By extracting the spatial relationship between a sensor position and a desired target detection area from an image, it is possible to intuitively generate high quality automated lighting scenes with sensors. Where a plurality of sensors already exist, the best matching sensor or sensors for fulfilling a certain sensing role (occupancy, daylight) in a certain light scene can be determined. This may be particularly applicable when sensors are integrated into luminaires. This will commonly lead to increased spatial density of sensors compared to the classical group sensing with just one centrally mounted sensor per subspace; examples with highly granular sensing can be found both within professional applications and consumer applications. When using integrated sensors within each fixture (e.g. for each troffer in an open plan office), the sensor density may be so high that it is sufficient to enable sensing only for a subset of the available sensors while retaining the sensing quality; by reducing the number of active sensors, it is possible to reduce the sensor-related communication load of the wireless network and hence enable more luminaires on one gateway.

The choice of which subset of the available sensors to activate may be dependent on the selected lighting control scheme or scene; for instance for an auto-on scene (i.e. a sensor switches on a light when a person enters the room) the active sensor should ideally be located next to the door, while in the case of a room with manual-on/auto-off control scheme (user has to always press the wall switch to activate light, while the light is automatically switched off after, say, 15 minutes of vacancy) the active sensor should be placed in the middle of the room to detect if a person is still present on the desk area.

Figure 4:
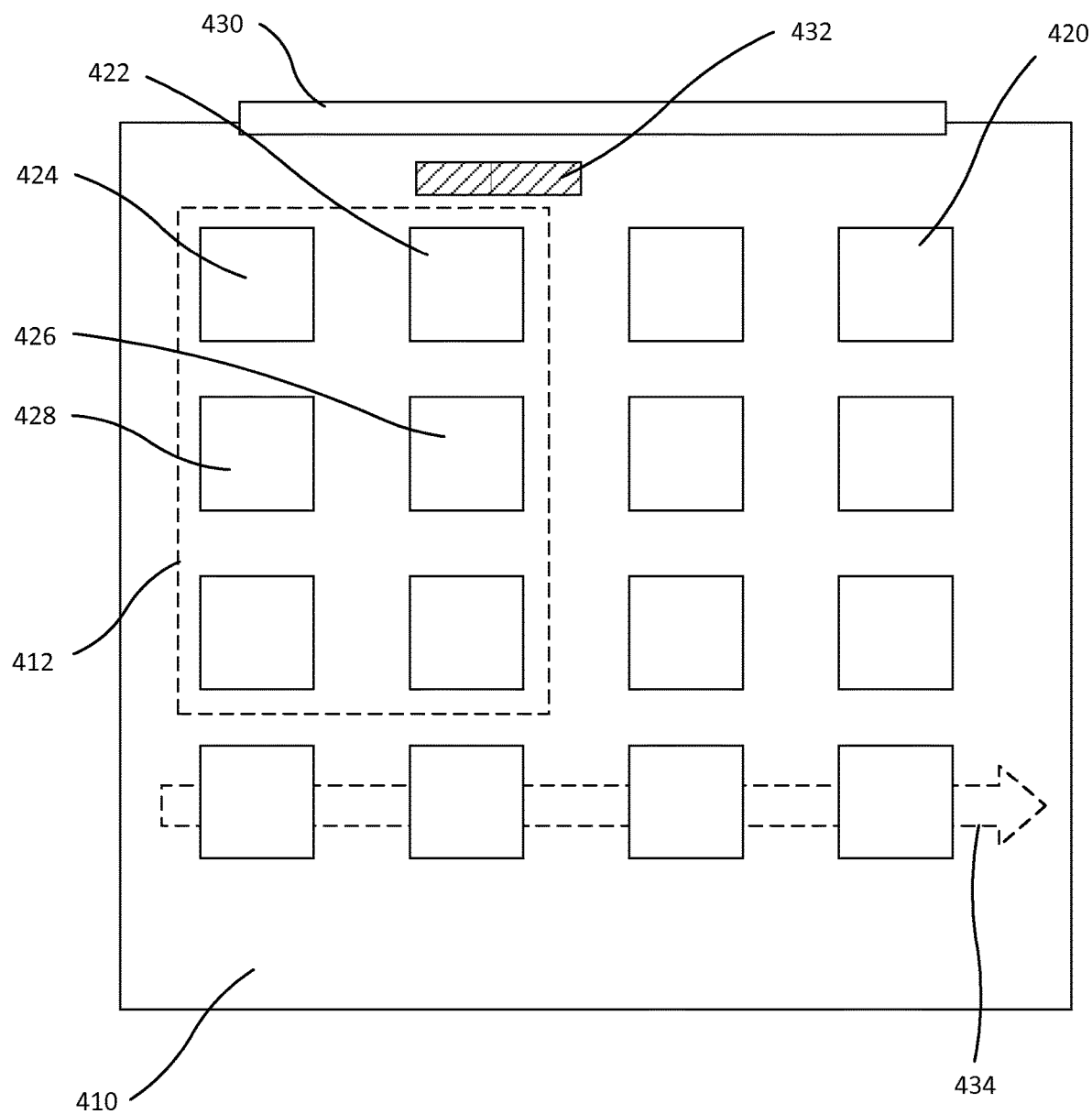
FIG. 4 is a plan view of an office including a lighting system.

An example of a professional office application will be given with reference to FIG. 4, which shows a schematic plan view of an office or workspace 410. The plan shows a window 430 at one end of the space, and a structural pillar 432 located by the window. The space includes 16 ceiling mounted luminaires 420 arranged in a 4×4 configuration. Each luminaire has an integrated light sensor and motion sensor in this example. A logical subspace comprises six luminaires identified by dashed box 412, and may be delineated by placement of office furniture such as desks and cubicle partitions for example.

An image, or images of the office space (which may be a panoramic image) can be obtained, and analyzed. By using spatial analysis or mapping based on the image, it is possible to identify the window 430 and pillar 432, and determine the relative positions of these objects. The positions of the luminaires may also be determined from an image, or may already be known. It is desirable for a daylight sensor for controlling the group 412 to be located adjacent to the window, however it is recognized by the image analysis that the column partially blocks the natural light underneath luminaire 422. Hence the luminaire 424 is selected as the best sensor position for daylight sensing.

Also as part of the image analysis, it is possible to identify a walkway or access route indicated by dashed arrow 434. For the purpose of occupancy sensing, it is determined that a sensor placement away from such a walkway would be beneficial to avoid false triggers from a passer by using the walkway or access route. Therefore either luminaire 426 or 428 is selected as the best occupancy sensor location for the group 412.

In the above example, possible sensor locations are limited to the positions of the sensors integrated into pre-installed luminaires. However, modern office applications make increasingly use personal task lights and free-floor standing luminaires; some of those luminaires already have integrated occupancy sensors; these personal task lights and free-floor standing luminaires are inherently movable by end-users. Such moveable luminaires can be identified in an image of the space in question, and based on the image the location can be determined. Hence, facility managers or end-users can be offered an easy way to re-configure the sensor configuration in a lighting system, simply by obtaining an image or images, after each configuration change in the room (e.g. rearrangement of desks and free-floor-standing lights & task lights).

Furthermore, while fixture-integrated sensors are typically mains-powered, also battery operated sensors are frequently used both in professional applications and residential applications. Such battery operated sensors offer freedom of placement location. Therefore, as well as selecting placement options for sensors from among existing placement of sensors (and equivalently luminaires having integrated sensors) new placement options can be suggested, even where no current sensor or luminaire exists. Also energy-harvesting sensors are becoming popular; these sensors get energized via a solar cell, requiring placement in a location with sufficient daylight or close to a permanently-on emergency luminaire in the egress path. The app can advise on whether an energy-harvesting sensor is possible in a certain room and if yes, where it should be placed.

Figure 5:
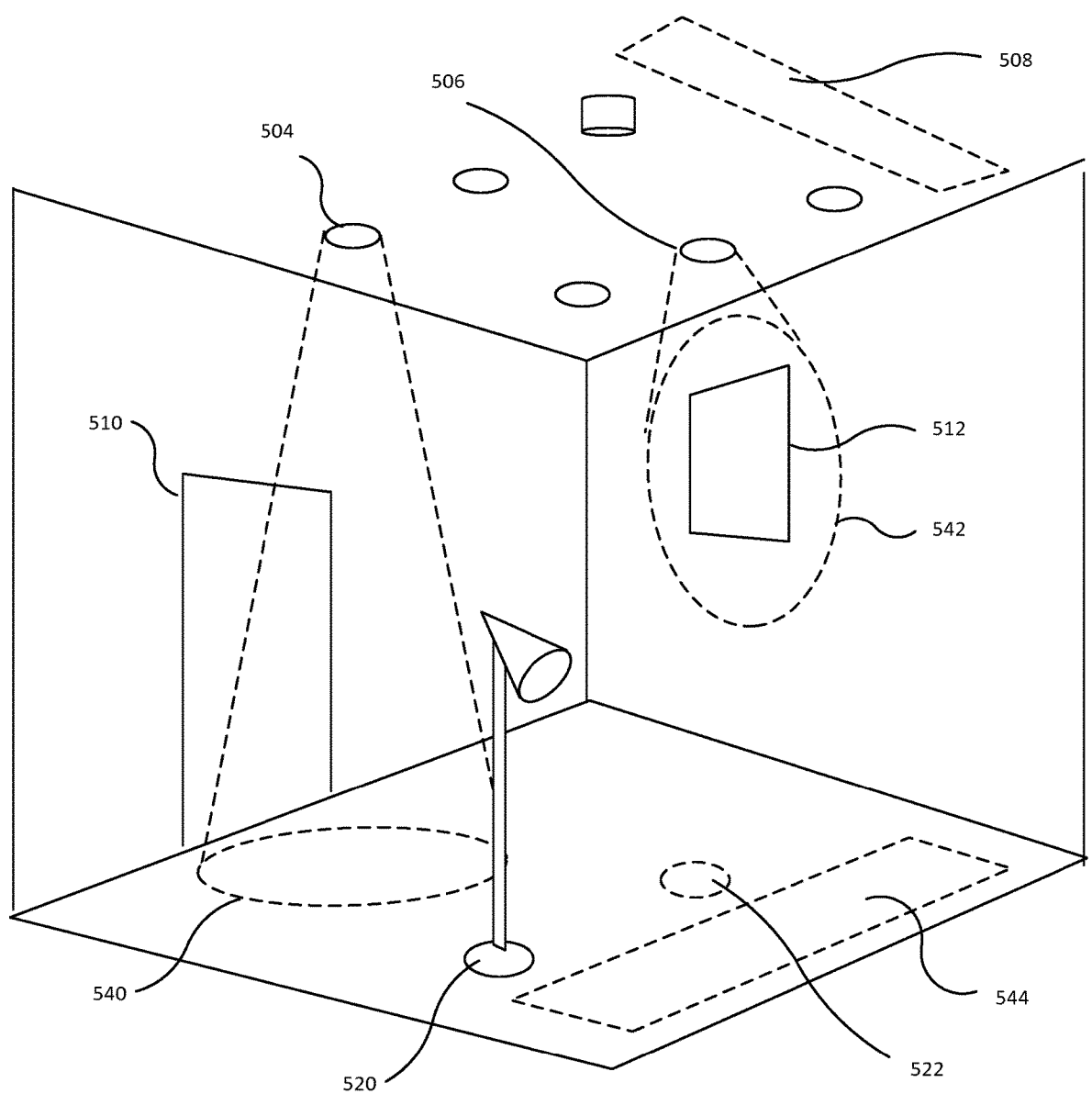
FIG. 5 shows the room of FIG. 1, with mappings between sensors and target areas.

FIG. 5 shows the scene or area of FIG. 1, subject to analysis of an image of the scene to configure sensor placement. The doorway 510 can be identified, and a target area 540 on the floor adjacent to the doorway can be determined for occupancy or motion sensing. Based on a spatial mapping of the room, which can be obtained based on an image or images, sensor 504 can be identified as providing coverage of the target area, and as being most suitable for occupancy sensing here. The characteristics or sensing parameters of the sensor may be known, or estimated, to map a target area on the floor to the point on the ceiling for example. Similarly, the window 512 can be identified, and a target area 542 designated for daylight sensing. Based on the geometry of the room, sensor 506 is determined as most suitable for daylight sensing.

In the above, target areas 540 and 542 may be determined automatically, based on processing or an image of the scene, and recognition of particular features associated with a sensing function, such as a window and a door. Target areas may however be input by other means, such as manual input. A target area 544 on a floor for example can be input to the system manually, where it is desired to detect the presence of a person or persons. Based on this input, a location 508 on the ceiling can be designated for placement of a stand-alone sensor for example. Alternatively or additionally lamp 520 may be identified as a sensor location for partially covering target area 544. It could also further be suggested that the lamp be moved to location 522 better to cover the target area 544.

In a similar manner (although not illustrated), in the example of a living room, where a user desires occupancy control, comprises a couch and several lazy chairs arranged around the couch table. The system can identify, based on a captured image or images, a sensor mounting position which covers the relevant chair areas where users will sit, but may not be able cover the adjacent transition area behind the chairs. In a professional office application example, the system may extract the location of the entrance door to a private-office room and suggest placement of the occupancy sensor in such a way that the sensor does not get triggered by passers-by in the hallway (to prevent false trigger if the door is open).

Optionally, more than one viewpoint can be used for imaging in order to perform mapping of a space, and sensor positions. Imaging is preferably performed from the primary location(s) where motion has to be detected. For example, if a living room has one entrance area with a door to the hallway and in its vicinity another door to the staircase, it is desired—to avoid clutter—to just place one occupancy sensor which triggers when somebody enters one of the two doors. In this case two images can be captured from the two target areas, and based on the two images the system can determine whether a single occupancy sensor may be used for motion detection. It may also be useful to shoot a series of panoramic images or video along the primary walking paths within the room (e.g. transition path from the kitchen to the couch).

In addition to determining location, a sensor type may be determined or suggested, and where sensors have variable parameters, settings for such parameters may be output. With advanced sensing technologies such as cameras, the sensitivity for certain areas of a room may be increased with respect to others. For example then, a sensor type (PIR vs Microwave), sensor mounting type (ceiling-mounted, corner mounted, sensor integrated in a lightbulb), model number or specifications such as optimal detection field of view may be determined. The system may guide the user by visualizations where to mount and position the sensor (e.g. using the image of the room or augmented reality).

One well known source of false occupancy trigger is air draft from an open window moving objects within the room, hence leading to false occupancy triggers. The spatial relationship between sensor location and the room's windows & doors (combined with status via a standard wireless open-close window/door sensor for example) enables the home automation system to reduce the sensor sensitivity whenever the room's window is open.

As already noted, the "scene" or type of lighting setting or output may be taken into account when configuring sensors. For example, based on the image mapping, an optimal role of the sensor for a specific lighting scene can assigned to each sensor. For instance, in a scene "watching TV on the couch", the sensor covering the couch is used at highest sensitivity setting to recognize fine motion (at expense of the sensor's battery life), while the sensors in the other part of the room are used at low sensitivity or may even be temporarily disabled.

Figure 6:
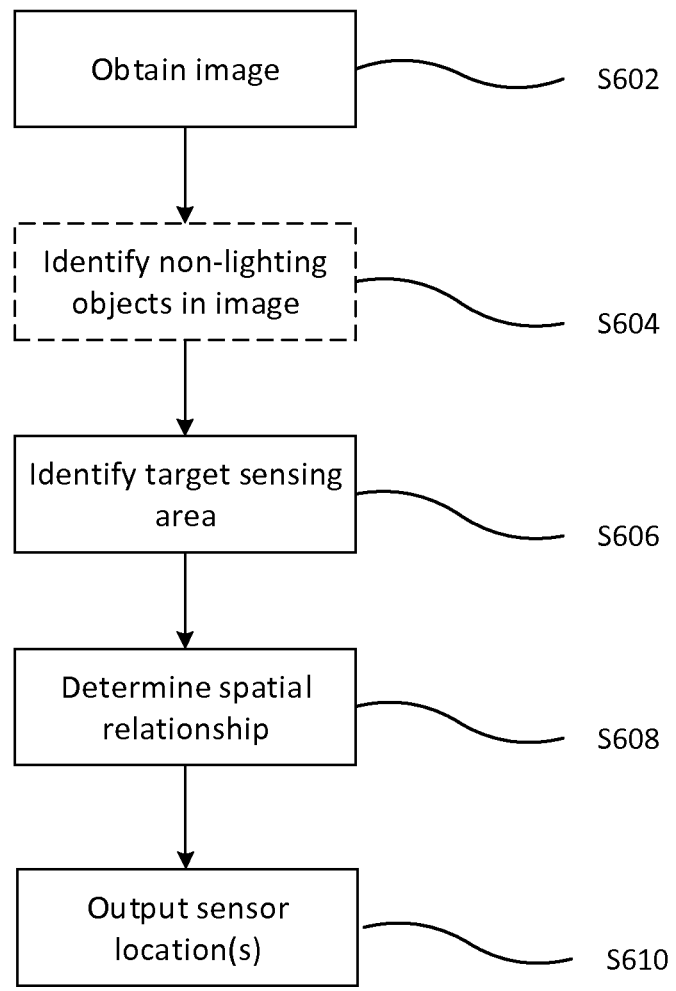
FIG. 6 is a flow diagram illustrating an example of a process for configuration of a lighting system.

FIG. 6 is a flow diagram illustrating an example of a process for configuration of sensors in a lighting control system.

In step S602, an image or images are obtained of a space or of an environment in which a lighting system is to be employed. The image may be a panoramic image as highlighted above, and may be from a single viewpoint, or multiple images may be obtained from multiple different viewpoints. In an optional step S604, the image or images are subject to processing to recognize objects. The identification, and position of such identified objects can be used to better understand how the space is used by occupants, and the conditions within the space. For example the most likely routes are between doors or access points, or along walkways clear from obstructions such as desks or filing cabinets. Identified windows, skylights or other features which allow daylight into a space provide input as to the distribution of natural light in the space, and possibly also ventilation and air movement. Such objects, used for assessing the environment, are typically not part of the lighting system, i.e. non-lighting, and non-sensing. However, lighting and sensing objects may also be identified.

In step S606, one or more target areas are identified. Such target areas are typically identified for a particular sensing role, such as occupancy/motion sensing or ambient light sensing. In some cases, the target area may be relevant to a specific light pattern or a particular control function or interaction with a sensor output, for example whether detection turns a light on, or absence of detection turns a light off, or both for example. The target area or areas may be based on objects identified in step S604, or may be input manually. The target areas could be identified directly onto an obtained image, or onto a model or other representation of the space.

The spatial relationship between a target area and a sensor location or locations is established at step S608. This relationship can be determined based on an obtained image or images, or a model or representation of the space based on such images. Such a model can be obtained by using known software and algorithms for constricting 3D representations from one or mode 2D images, typically by attributing a depth value to points in an image. Sensor parameters such as range and field of view can also be used to map a target area to a sensor location.

The sensor location may be selected from a number of possible existing sensor locations, which locations may be integrated into luminaires.

Lastly at step S610, the sensor location or locations are output. The output may be to a user to allow them or prompt them to input settings to a lighting system or to physically move a sensor or luminaire for example, or the output may be directly to a lighting system to change certain configuration settings or parameters.

It will be understood that the present invention has been described above purely by way of example, and modification of detail can be made within the scope of the invention. Each feature disclosed in the description, and (where appropriate) the claims and drawings may be provided independently or in any appropriate combination.

The various illustrative logical blocks, functional blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the function or functions described herein, optionally in combination with instructions stored in a memory or storage medium. A described processor may also be implemented as a combination of computing devices, e.g., a combination of a DSP and a microprocessor, or a plurality of microprocessors for example. Conversely, separately described functional blocks or modules may be integrated into a single processor. The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, and a CD-ROM.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored and/or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method for configuring a lighting system including one or more sensors for controlling one or more lighting units for providing illumination of an area, said method comprising:
    obtaining one or more images of the area;
    for a given sensing function, identifying, based on said obtained one or more images, at least one target area where said sensing function is to occur;
    determining, based on said obtained one or more images and said identified at least one target area, one or more sensor locations suitable for providing said sensing function at said target area; and
    prompting a user to provide a new sensor or move an existing sensor to said one or more sensor locations.

2. A method according to claim 1, wherein one or more predetermined objects are identified in the one or more obtained images, and said target area is based on said identified predetermined objects.

3. A method according to claim 2, wherein said predetermined objects include at least one of a door, a window, a corridor, a desk, a wall, a ceiling fan, or an HVAC air outlet.

4. A method according to claim 1, wherein said target area is identified manually.

5. A method according to claim 1, wherein said one or more images includes a panoramic image composed of a plurality of sub-images.

6. A method according to claim 1, wherein said at least one target area is determined based on a viewpoint of said one or more images.

7. A method according to claim 1, wherein said one or more obtained images include images from at least two different viewpoints.

8. A method according to claim 1, further comprising capturing said obtained one or more images with an image capture device, by a user.

9. A method according to claim 8, wherein said image capture device is a mobile phone.

10. A method according to claim 1, wherein said one or more sensor locations are output to a user.

11. A method according to claim 10, wherein said one or more sensor locations are output to the user through a map, said map derived from said obtained one or more images.

12. A method according to claim 10, wherein said one or more sensor locations are output to the user by indicating said one or more sensor locations on said obtained one or more images.

13. A method according to claim 1, wherein said one or more sensor locations are output to said lighting system directly.

14. A computer program comprising instructions which, when executed on a computer, cause that computer to perform the method of claim 1.

* * * * *